Patented May 29, 1951

2,554,908

UNITED STATES PATENT OFFICE 2,554,908

SEPARATION OF HYDROCARBONS BY SELECTIVE ADSORPTION

Alfred E. Hirschler, Drexel Hill, Pa., assignor to Sun Oil Company, Philadelphia, Pa., a corporation of New Jersey No Drawing. Application March 3, 1948,
Serial No. 12,902

7 Claims. (Cl. 260—677)

This invention relates to the separation of organic compounds by selective adsorption and is particularly directed to an improved method for effecting the separation of organic compounds, more especially hydrocarbons, from mixtures thereof containing at least one constituent which has a tendency to polymerize or otherwise react under the influence of heat in the presence of the adsorbent. The invention is especially useful in the treatment of mixtures containing unsaturated hydrocarbons such as olefins, diolefins, acetylenes, styrene or the like.

In the prior art various separations of hydrocarbons have been effected, especially between different chemical types of hydrocarbons, by treating the hydrocarbons in liquid phase with an adsorbent such as silica gel, activated carbon, alumina gel or the like, to cause selective adsorption of one or more of the starting hydrocarbons. This is usually done by filtering the hydrocarbons through a bed of the adsorbent, the more adsorbable component being preferentially retained within the bed while the least adsorbable component tends to pass out of the bed in the first portion of filtrate. Following the adsorption step, removal of the adsorbed hydrocarbon has been effected in various ways such as by means of heat, hot gases, steam, alcohol or other polar liquids, or another hydrocarbon which is sufficiently strongly adsorbable to displace the adsorbed hydrocarbon.

In attempting to apply the prior art technique, of selective adsorption followed by desorption, to the separation or purification of readily polymerizable hydrocarbons it has been found that considerable polymerization may occur. This polymerization may be due, during the adsorption step, to generation of heat within the adsorbent as a result of wetting of the adsorbent, or, during the desorption step, to the use of heated desorbing agents. Even in cases where the desorbing medium is not previously heated, polymerization may still occur due to release of heat resulting from a higher heat-of-wetting of the adsorbent by the desorbing agent than by the adsorbate. Such release of heat generally occurs when the desorbing agent is more strongly adsorbable than the adsorbate, for example, when a polar desorbing agent such as alcohol is used or when an aromatic hydrocarbon is used to displace an olefin. It has also been proposed to use a hydrocarbon desorbent which is less strongly adsorbed than the adsorbate which is to be displaced, for example, a paraffin to remove an olefin; but this entails the disadvantage of requiring the use of a relatively large amount of the desorbing agent.

It is an object of the invention to provide a liquid phase adsorption-desorption process for separating or purifying hydrocarbons or other organic compounds which tend to polymerize or otherwise react under the influence of heat in the presence of the adsorbent, in which process such tendency to polymerize is minimized or substantially avoided without requiring the use of large quantities of desorbent.

In one embodiment of the invention, the process comprises:

(a) maintaining a bed of the adsorbent in a filtration zone;

(b) first wetting at least a portion of the adsorbent with a non-polymerizable hydrocarbon liquid which is less strongly adsorbable than, and which preferably has a boiling point different from, the hydrocarbon to be separated;

(c) then introducing the charge mixture into the wetted adsorbent and passing it through the bed;

(d) preferably following the charge mixture with a non-polymerizable hydrocarbon liquid which is less strongly adsorbable than, and has a boiling point different from, the hydrocarbon to be separated;

(e) and then introducing a liquid desorbing agent comprising a non-polymerizable hydrocarbon which is more strongly adsorbable than, and has a boiling point different from, the hydrocarbon to be separated, either alone, or preferably in admixture with a non-polymerizable hydrocarbon which is less strongly adsorbable than, and has a boiling point different from, the hydrocarbon to be separated.

Where the desorbing agent employed in step (e) is a mixture of said more strongly and less strongly adsorbable hydrocarbons, step (d) may be omitted if desired. However, it is preferred to include step (d) in the operation so as to insure more completely against heat-of-wetting effects that may cause polymerization of the charge hydrocarbons.

For purpose of illustration, the treatment of a hydrocarbon mixture containing pentadiene may be taken as an example. A column packed with a suitable selective adsorbent, for example, silica gel, may be employed in carrying out the process. There is first introduced into the column at one end thereof (say, the top) a non-polymerizable hydrocarbon liquid in accordance with step (b) supra, so as to wet at least a portion of the silica gel. Saturate hydrocarbons (paraffins and naphthenes) are examples of such material. It is preferred that this material have a boiling point or boiling range different from that of the hydrocarbon mixture to be separated, so that any admixture that may be obtained as efflux from the column may readily be separated by distillation. Such difference in boiling point is not essential, however, since the hydrocarbon liquid used in step (b) is less strongly adsorbable than the pentadiene and therefore will be mainly pushed out of the column ahead of the pentadiene; but inasmuch as there generally will be at least a small amount of mixing within the column, it is preferable that a non-polymerizable hydrocarbon liquid be used which has a boiling point or boiling range different from the charge hydrocarbons. In the present case, isooctane is a good example of a suitable non-polymerizable hydrocarbon liquid for step (b). Any other saturate hydrocarbon liquid having a boiling point sufficiently different from pentadiene (either lower or higher) would be equally satisfactory. For instance, other paraffin hydrocarbons or naphthene hydrocarbons may be used as well as mixtures of such hydrocarbons.

In the following description, the non-polymerizable hydrocarbon liquid used in step (b) will be considered, for purpose of illustration, to be isooctane. As the dry silica gel becomes wetted with the isooctane, heat will be evolved due to heat-of-wetting. This heat may be removed by allowing time for its dissipation, by providing indirect heat exchange means or by continuing the addition of the isooctane to absorb and remove the heat generated. Then the charge containing the pentadiene is introduced into the top of the column and is allowed to filter through the bed to selectively adsorb the pentadiene. In some cases it may be advantageous to dilute the charge with isooctane or another saturate hydrocarbon or a mixture of saturates before the charge is added to the column so as to reduce differential heat-of-wetting effects. After all of the charge has been added, a further amount of isooctane or other saturate hydrocarbon preferably is introduced in accordance with step (d) supra. The hydrocarbon material introduced at this point may be the same or different from that used in step (b) but in any case should have a boiling point or boiling range different from that of pentadiene or other charge hydrocarbons, since it will pass from the column in admixture with charge hydrocarbons which have been desorbed from the gel and therefore should be readily separable therefrom by distillation. Also it is preferable that the hydrocarbon liquid introduced in step (d) boil outside of the boiling range of the desorbing agent specified in step (e), so that it also may be readily separated from any desorbing agent with which it may become mixed while passing through the column.

Following step (d), a desorbing agent as specified in step (e) is passed through the column in the same direction. One suitable type of desorbing agent for pentadiene is an aromatic hydrocarbon or a mixture of aromatic hydrocarbons. For purpose of illustration, the invention will be described with benzene as the desorbing agent although any other non-polymerizable aromatic or mixture of aromatics would be suitable. The benzene may be used alone provided that the addition of isooctane according to step (d) has been included; but it is preferred to employ the benzene in admixture with a saturate hydrocarbon, for example, to employ a mixture of benzene and isooctane as the desorbing agent, for reasons more fully explained below. A composite mixture of aromatic and non-aromatic hydrocarbons, such as naphtha or gasoline, may also be used as the desorbing agent.

The filtrate from the column may be collected in suitable cuts from which the pentadiene may be separated by distillation. The benzene and isooctane may be separately recovered and reused.

The adsorbabilities of isooctane, pentadiene and benzene increase in the order given. When a mixture of substances of different adsorbabilities in approximately equivalent concentrations is passed through a column of adsorbent, the rates of progress of the individual substances are in inverse ratio to their adsorbabilities. Thus the rates of advance of the hydrocarbons above mentioned decrease in the order isooctane>pentadiene>benzene. Since isooctane travels faster than pentadiene, it is necessary that only a portion of the adsorbent be wetted with isooctane before adding the pentadiene-containing charge in order to prevent the contact of pentadiene with dry adsorbent.

The addition of isooctane following the pentadiene serves to substantially desorb the diene from the top portion of the column before the benzene, which will produce a further heat-of-wetting effect, is added. If benzene alone is employed as the desorbing agent and only a relatively small amount of isooctane is added prior to the introduction of the benzene, the separation of diene and benzene zones will be progressively reduced, inasmuch as the isooctane will travel faster through the adsorbent than the pentadiene and pure benzene will travel faster than the pentadiene can be desorbed by the isooctane. At some point in the column the benzene may overtake the pentadiene and produce an interface on one side of which is pentadiene of relatively high concentration and on the other side benzene of relatively high concentration. At this interface, as it progresses through the adsorbent, considerable heat would be liberated due to the higher heat-of-wetting of silica gel by benzene than by pentadiene. This release of heat would tend to promote polymerization of the pentadiene. It is therefore desirable, when pure benzene is used as the desorbing agent, to employ a sufficient amount of isooctane in step (d) to desorb a large proportion of the pentadiene and carry the same out of the column before the benzene reaches the bottom of the column.

The use of a mixture of an aromatic and a saturate, such as benzene and isooctane, as the desorbing agent serves to prevent the formation of an undiluted pentadiene-benzene interface during the desorption operation. Since isooctane will travel through a bed of silica gel considerably faster than benzene due to the lower adsorbability of the isooctane, it will be continuously fed into the zone between the benzene and pentadiene and will serve to prevent the concentration of pentadiene from exceeding a certain value. This value will be a function of the relative amounts of isooctane and benzene in the desorbing liquid, the greater the proportion of isooctane the lower being the maximum pentadiene concentration. Further, the presence of isooctane in the desorbing agent reduces the heat-of-wetting, and the isooctane also serves to carry away heat released at the benzene zone boundary. It is therefore not essential, when the desorbing agent is a mixture of the more strongly absorbable and less strongly adsorbable hydrocarbons, to include step (d) in order to prevent the formation of an undiluted pentadiene-benzene interface, although it is desirable to add at least a small amount of isooctane between the additions of charge and desorbing agent so as to insure against contact of the benzene zone with pentadiene of high concentration at the top of the column. As a general rule, the higher the concentration of saturate hydrocarbon used with the benzene the less is the amount of hydrocarbon liquid that need be added in step (d).

The following examples, in which percentages are on a volume basis, will serve to illustrate the above described embodiment of the invention:

EXAMPLE I

A water-cooled column with a packed section of 1.3" x 9' and containing 1600 grams 28–200 mesh silica gel was first charged with 150 ml. isooctane, then 430 ml. of a mixture of cis and trans 1,3-pentadiene (piperylene) containing non-pentadiene impurities was added, followed by 500 ml. isooctane. Sufficient 15% isooctane-85% benzene mixture was then added to desorb the pentadienes, and the percolate was collected in several separate cuts. The pentadienes were separated from benzene and isooctane by distillation of the cuts, and the pentadiene products were analyzed by means of an infrared spectrometer. The results are summarized as follows:

*Purification of 1,3-pentadiene*

| Cut No. | Vol. of Filtrate, ml. | Vol. of Distillate, ml. | Piperylene Content of Distillate, Per Cent | | |
|---|---|---|---|---|---|
| | | | Cis | Trans | Total |
| 1 | 230 | 40 | 31.8 | 68.2 | 83 |
| 2 | 147 | 48 | | | |
| 3 | 246 | 58 | 36.9 | 63.1 | 90 |
| 4 | 184 | 21 | | | |
| 5 | 186 | 52 | 37.2 | 62.8 | 97 |
| 6 | 142 | 72 | 41.5 | 58.5 | 99 |

The data show that piperylene of high purity was obtained as the distillate from cuts 5 and 6. The data also show that a partial separation of the cis and trans isomers was effected. The infrared analysis indicated that the impurities in the charge comprised at least two different constituents and that one of these was substantially absent from cuts 5 and 6.

By way of contrast, it was found that when a similar piperylene charge was treated in the conventional manner by introducing the same into a column of dry silica gel and displacing the charge material directly by means of ethyl alcohol, the product obtained from the column contained on the order of 25% polymer.

EXAMPLE II

A water-cooled column was a packed section 1" x 9' filled with 850 grams 28–200 mesh silica gel was first charged with 100 ml. isooctane. Then 150 ml. of a mixture of 10% by vol. 1,3-pentadiene (mixed cis and trans) and 90% isoprene was added. Following the dienes, 100 ml. of isooctane was added, and the dienes were desorbed with a 15% isooctane–85% benzene mixture. The filtrate was collected in fractions, and the dienes were recovered by distillation. The distillates were analyzed by infrared spectrometer.

*Separation of 1,3-pentadiene from isoprene*

| Cut No. | Vol. of Filtrate, ml. | Vol. of Distillate, ml. | Composition of Distillate, per cent | | |
|---|---|---|---|---|---|
| | | | 1,3-Pentadiene | | Isoprene |
| | | | Cis | Trans | |
| Charge | | | 3.6 | 6.4 | 90 |
| 1 | ¹ 140 | | | | |
| 2 | 25 | 2.5 | | | |
| 3 | 74 | 34 | 1.1 | 0 | 98.9 |
| 4 | 49 | 35 | 2.6 | 1.8 | 95.6 |
| 5 | 72 | 38 | 4.5 | 6.9 | 88.6 |

¹ Pure isooctane.

The data show that the 1,3-pentadiene components were selectively adsorbed from the charge and that isoprene of relatively high purity was obtained (Cut No. 3). Also some selective separation of the cis and trans isomers was effected.

EXAMPLE III

A 1" x 9' column filled with 850 grams silica gel was used. First 250 ml. of isooctane was added; then 138 ml. of 1,3-pentadiene (piperylene), containing both the cis and trans forms, was added; 1500 ml. of isooctane was then added, followed by benzene. The first 20 ml. and last 10 ml. of the recovered piperylene were examined by infrared spectrometer. (The last cut of 10 ml. was obtained from the benzene cuts.) The results indicated that the last cut contained more cis isomer than the first cut; likewise, a considerable amount of non-piperylene impurity in the first cut was found to be absent in the last, indicating purification of the past portion of the filtrate.

This run differs from the preceding ones in that a much larger proportion (about 90%) of the dienes was desorbed by isooctane before the benzene reached the bottom of the column.

The first cut above mentioned was recovered from the percolate fraction between 360 and 610 ml. total volume; the last, from the portion between 1572 and 1698 ml.

EXAMPLE IV

A 1" x 8.5' column containing 800 grams silica gel was used. Tap water at about 18° C. was flowed down the outside of the column to effect cooling. First 100 ml. isooctane was added, then 150 ml. of trans-piperylene of 89.8% purity, containing cis-piperylene as the chief impurity. 200 ml. of isooctane was added, followed by 1150 ml. of a mixture consisting of 20% isooctane and 80% benzene. The filtrate cuts were distilled and the distillates analyzed by the freezing point method. Results were as follows:

*Purification of trans-1,3-pentadiene*

| Cut No. | Vol. of Filtrate, ml. | Vol. of Distillate, ml. | Per Cent Trans-1,3-Pentadiene Distillate |
|---|---|---|---|
| Charge | | | 89.8 |
| 1 | (Pure isooctane) | | |
| 2 | 226 | 29 | 90.6 |
| 3 | 75 | 38 | 95.0 |
| 4 | 54 | 20 | 94.2 |

These results show that the cis isomer was selectively adsorbed. Further purification of the trans isomer could have been effected by re-treating the cuts in accordance with the invention.

In a further embodiment, the invention may be practiced as a continuous process operating in a cyclic manner. In such operation each cycle may include steps (b), (c), (d) and (e) in the order named, step (b) then being repeated to start a new cycle. In step (b) of each cycle, a sufficient amount of saturate hydrocarbon should be added to effect desorption of a major portion of the aromatic previously added in step (e). The remainder of the aromatic hydrocarbon on the gel will then be displaced from the column during each cycle by means of the charge mixture introduced in step (c) and by the hydrocarbon liquid added in step (d). As previously stated, step (d) may be omitted if desired, especially where the desorbing agent used in step (e) contains a relatively large proportion of saturate material admixed with the aromatic.

I have found that the process may be practiced in such cyclic manner not only for the purpose of separating an olefinic hydrocarbon from a mixture containing it while minimizing or avoiding any polymerization of such olefin, but at the same time to separate aromatics from a composite hydrocarbon mixture. For example, by employing a naptha fraction, such as gasoline or kerosene, as the desorbing agent in step (e), an aromatic concentrate may be obtained as a further product of the operation. In other words, the process may be used to separate an olefinic hydrocarbon from one charge material, while at the same time concentrating aromatics from another charge material. The two charge materials should have different boiling ranges so that intermixtures of components from the different materials may be separated into the desired components by distillation.

By way of illustration of this modification of the invention, the use of a pentadiene-containing charge as the mixture introduced in step (c) and of a naphtha fraction boiling (say) within the range 300–400° F. as the desorbing agent for step (e) will be described. The first-named charge may be an admixture, for example, of pentadiene, pentenes and pentanes. The naphtha fraction may be straight run, thermal, catalytic or other gasoline fraction composed mainly of aromatic and saturate hydrocarbons. It may also contain a minor amount of olefins. The aromatic content of the naphtha permissively may vary widely but preferably should be at least 15%. Generally, the lower the aromatic content the more naphtha that is required to be introduced in each cycle and the lower will be the aromatic content of the aromatic concentrate fractions obtained.

During each cycle, the olefinic charge is introduced into the filtration zone and passed into adsorbent which is already in a wetted condition from the previous cycle. During passage of the charge through the adsorbent, the pentadiene, being more strongly adsorbable than the pentenes or pentanes, is selectively adsorbed and at the same time hydrocarbons previously adsorbed by the gel are displaced therefrom. After addition of the olefinic charge, the naphtha may, if desired, be immediately added, but it is preferable first to add at least a small amount of a saturate hydrocarbon or mixture of saturate hydrocarbons in accordance with step (d). Where such addition is made, the hydrocarbon material added should boil outside of the boiling range of the olefinic charge (either higher or lower) and preferably also outside of the boiling range of the naphtha fraction. In the present case hexanes, heptanes, octanes, methylcyclohexane and the like are good illustrations of saturate hydrocarbons which boil outside of both of the aforesaid boiling ranges. A mixture of paraffin and naphthene hydrocarbons such as a 200–250° F. gasoline fraction from which aromatics have been previously removed would also be suitable. Also, an essentially saturate fraction derived from the 300–400° F. naphtha and obtained as a product of the process itself could, if desired, be used as the non-polymerizable hydrocarbon liquid introduced in step (d).

Following step (d), the naphtha fraction is introduced into the filtration zone. The aromatics will be preferentially adsorbed from the naphtha and, as previously stated, saturates will therefore travel faster through the zone than the aromatics. These saturates will serve to effect partial displacement of the pentadiene and to maintain the same in a diluted state. Then, as the aromatics progress through the filtration zone, the remainder of the pentadiene will be displaced from the adsorbent and will be pushed out of the column in admixture with the naphtha saturates from which it may be recovered by distillation.

Following the introduction of the naphtha, a saturate hydrocarbon or mixture of saturate hydrocarbons is introduced to desorb aromatics. This is equivalent to step (b) supra. Since this material will pass out of the column in admixture with the desorbed aromatics, it should have a boiling point or boiling range such as to be readily separable therefrom by distillation. It is preferable also that it boil outside of the boiling range of the olefinic charge. The same or similar materials as mentioned in connection with step (d) would be suitable as the liquid introduced here, and should be added in sufficient amount to desorb a major amount of the aromatic adsorbate and to maintain the aromatics in dilute form. This will insure that, upon subsequent addition of olefinic charge in the next cycle, the olefins will not come in contact with aromatics of high concentration in progressing through the column. Such olefins will effectively displace any residual aromatics remaining on the adsorbent.

By operating in the above-described cyclic manner and collecting suitable filtrate cuts from the column and distilling the same, not only may the pentadiene be obtained in purified or concentrated form but an aromatic concentrate may also be obtained. Also the saturate hydrocarbons of the naphtha may be obtained in concentrated form. As previously stated, an essentially saturate naphtha fraction (say, containing less than 5% aromatics) may be obtained and may be used, if desired, as the material introduced in step (d).

The following example will illustrate this type of operation:

EXAMPLE V

In this example the operation was conducted through two cycles. A 1″ column packed with 500 grams of silica gel to a height of approximately 5¼′ was used, the column being maintained cool by flowing tap water at about 20° C. down the outside of the column. First, 100 ml. of isooctane was introduced into the top of the column and permitted to filter into the silica gel. This was immediately followed by 75 ml. of an olefinic charge made by mixing 10 parts of isoprene with 90 parts of a mixture composed of 90% trans-piperylene with cis-piperylene as its major impurity. Following the olefinic charge, 50 ml. isooctane was added. Then 250 ml. of a catalytic gasoline cut having a boiling range of 320–360° F. and containing about 54% aromatics and 4% olefins was introduced into the column. Finally 3060 ml. of isooctane was passed into the adsorbent to effect desorption and regenerate the gel. The percolate from the column was collected in various fractions which were distilled to effect separation.

Two aromatic concentrate fractions were thereby obtained as the undistilled portions from two of the cut distillations. One of these had a volume of 15 ml. and contained about 84% aromatics and about 3% olefinic compounds derived from the gasoline fraction. The other, amounting to 68 ml., contained about 96% aromatics and about 2% olefins derived from the gasoline cut. The overhead cuts containing the $C_5$ diolefins were not analyzed for this cycle of operation.

The used gel was then reused in a second cycle to separate a mixture composed of 10% trans-piperylene and 90% isoprene. 100 ml. of this mixture was added to the wet gel, then 50 ml. isooctane was added, and this was followed by 175 ml. of the 320–360° F. gasoline cut. Finally, 2000 ml. of isooctane was filtered through the column to effect desorption. The filtrate from the column was collected in suitable separate cuts which were then distilled to recover the dienes, isooctane, and aromatics separately. The dienes were analyzed by infrared absorption with results as follows:

| Cut | Diene recovered as distillate, per cent of dienes charged | Per cent Isoprene in distillate |
|---|---|---|
| A | 8 | 96.4 |
| B | 11 | 97.7 |
| C | 12 | 97.0 |
| D | 12 | 96.4 |
| E | 15 | 95.5 |
| F | 19 | 94.6 |
| G | 18 | 89.8 |

From cut G and the next succeeding cut (these totaling 199 ml. before distillation), 27 ml. of aromatic concentrate was obtained as residuum. This material contained about 92% aromatics and about 3% olefins derived from the gasoline cut. From the remaining cuts (which totaled about 1100 ml. before distillation), 18 ml. of a second aromatic concentrate was obtained. This product was found to contain 97% aromatics and no olefins. These data show that the described cyclic process effected separation of the diene charge and at the same time yielded an aromatic product of high concentration. The yields of aromatic concentrates were somewhat lower than would be obtained in larger scale operation due to losses involving in distilling such small volumes of material.

While the present invention has particular utility in the treatment of hydrocarbon mixtures having one or more constituents which tend to polymerize or otherwise react in the presence of the adsorbent when treated according to conventional techniques, it is also applicable to the treatment of other types of organic compounds having a tendency to polymerize. For example, the invention may be used in the separation or purification of compounds such as chloroprene or acrylonitrile. In such cases the invention contemplates the use of organic materials other than hydrocarbons in the various steps of the operation. For instance, the material used to wet the adsorbent prior to introducing the charge therein may be any non-polymerizable organic compound which is less strongly adsorbable than, and has a boiling point different from, the polymerizable component of the charge. Carbon tetrachloride is a specific example of such a compound. This material or another compound having similar characteristics may also be used as the liquid introduced immediately after the charge as per step (d). As the desorbing agent for step (e), an organic liquid, other than a hydrocarbon, which is more strongly adsorbable than, and has a boiling point different from, the polymerizable component of the charge, may be employed. For example, in the treatment of a charge containing chloroprene, ethylene dichloride could be used, and preferably would be employed in admixture with a less adsorbable material, such as a saturate hydrocarbon or carbon tetrachloride, for reasons hereinbefore explained. Other examples of more strongly adsorbable compounds which could be employed as desorbing agent, if desired, are organic polar compounds such as alcohols, ketones, nitroparaffins or the like.

It will therefore be understood that numerous variations or modifications are permissible within the scope of the invention the essence of which is a process, or modus operandi, enabling the application of the adsorption-desorption technique to the separation or purification of organic compounds which tend to polymerize or otherwise react when treated according to the conventional modes of conducting such adsorption-desorption operations.

Where the term non-polymerizable is used herein, it is to be taken not necessarily in an absolute sense but rather as meaning that the compound referred to does not tend to undergo polymerization in the presence of the adsorbent under ordinary conditions of operation. Thus compounds which may be polymerizable under more or less severe conditions (e. g. at high temperature in the presence of a polymerization catalyst) nevertheless may be entirely satisfactory as the non-polymerizable compound for steps (b), (d) and (e), supra, of the present process.

Having described my invention, what I claim and desire to protect by Letters Patent is:

1. Method of separating by means of an olefin-selective adsorbent an olefin from a non-aromatic hydrocarbon charge containing it, which olefin has a tendency to polymerize in the presence of the adsorbent, which comprises: introducing into said adsorbent a saturated hydrocarbon liquid to wet the adsorbent, then introducing said hydrocarbon charge in liquid phase into the adsorbent to selectively adsorb said olefin, then introducing a further amount of said saturated hydrocarbon liquid into the adsorbent to partially desorb the olefin, and then introducing into the adsorbent a liquid hydrocarbon desorbing agent composed at least mainly of aromatic hydrocarbon to further desorb the olefin, said desorbing agent, said charge and said saturated hydrocarbon liquid each boiling outside of the boiling range of the others so as to be separable by distillation.

2. Method according to claim 1 wherein said desorbing agent is composed of a major amount of aromatic hydrocarbon and a minor amount of saturated hydrocarbon.

3. Method according to claim 2 wherein the adsorbent is silica gel.

4. Method according to claim 1 wherein the adsorbent is silica gel.

5. Method according to claim 1 wherein the olefin is a diolefin.

6. Method according to claim 5 wherein the adsorbent is silica gel.

7. Method of separating by means of silica gel a hydrocarbon charge mixture composed essentially of diolefins while minimizing polymerization which comprises: introducing a saturated hydrocarbon liquid into the silica gel to wet it, introducing the hydrocarbon charge in liquid phase into the silica gel to selectively adsorb one of the diolefins, then introducing a further amount of said saturated hydrocarbon liquid into the silica gel to effect partial desorption, and then introducing into the silica gel a liquid desorbing agent composed of a major amount of aromatic hydrocarbon and a minor amount of saturated hydrocarbon to effect further desorption, said desorbing agent, said charge and said saturated hydrocarbon liquid each boiling outside of the boiling range of the others so as to be separable by distillation.

ALFRED E. HIRSCHLER.

REFERENCES CITED

The following references are of record in the file of this patent:

UNITED STATES PATENTS

| Number | Name | Date |
|---|---|---|
| 2,384,311 | Kearby | Sept. 4, 1945 |
| 2,390,536 | Houdry et al. | Dec. 11, 1945 |
| 2,395,491 | Mavity | Feb. 26, 1946 |
| 2,398,101 | Lipkin | Apr. 9, 1946 |
| 2,449,402 | Lipkin et al. | Sept. 14, 1948 |

OTHER REFERENCES

Mair: "Separation and Determination of Aromatic and Monoolefin Hydrocarbons . . . by Adsorption," Bureau of Standards Research Paper R. P. 1652; part of Journal of Research of the Nat. Bureau of Standards, vol. 34, May 1945, page 448.